(12) United States Patent
Brault et al.

(10) Patent No.: US 9,322,293 B2
(45) Date of Patent: Apr. 26, 2016

(54) TURBOJET VENTING PIPE, METHOD FOR MOUNTING ONE SUCH PIPE AND TURBOJET PROVIDED WITH ONE SUCH PIPE

(75) Inventors: Michel Gilbert Roland Brault, Quincy sous Senart (FR); Philippe Pierre Vincent Bouiller, Samoreau (FR)

(73) Assignee: SNECMA, Paris (FR)

( * ) Notice: Subject to any disclaimer, the term of this patent is extended or adjusted under 35 U.S.C. 154(b) by 644 days.

(21) Appl. No.: 13/636,802

(22) PCT Filed: Mar. 28, 2011

(86) PCT No.: PCT/FR2011/050676
§ 371 (c)(1),
(2), (4) Date: Sep. 24, 2012

(87) PCT Pub. No.: WO2011/117560
PCT Pub. Date: Sep. 29, 2011

(65) Prior Publication Data
US 2013/0008550 A1    Jan. 10, 2013

(30) Foreign Application Priority Data

Mar. 26, 2010  (FR) ..................................... 10 52239
Mar. 26, 2010  (FR) ..................................... 10 52242

(51) Int. Cl.
| F01D 25/18 | (2006.01) |
| F16L 37/14 | (2006.01) |
| F16L 21/08 | (2006.01) |

(52) U.S. Cl.
CPC ................. *F01D 25/18* (2013.01); *F16L 21/08* (2013.01); *F16L 37/14* (2013.01); *F05D 2230/64* (2013.01); *F05D 2230/642* (2013.01); *F05D 2240/61* (2013.01); *F05D 2260/30* (2013.01); *F05D 2260/602* (2013.01); *F05D 2260/6022* (2013.01); *Y10T 29/49826* (2015.01)

(58) Field of Classification Search
None
See application file for complete search history.

(56) References Cited

U.S. PATENT DOCUMENTS

| 5,368,335 A | * | 11/1994 | Dinnes ............................ 285/18 |
| 7,004,725 B2 | * | 2/2006 | Vache et al. ................. 416/93 R |
| 7,384,075 B2 | * | 6/2008 | Ress, Jr. ........................ 285/333 |

FOREIGN PATENT DOCUMENTS

FR   2 901 313   11/2007

OTHER PUBLICATIONS

International Search Report Issued Jun. 9, 2011 in PCT/FR11/50676 Filed Mar. 28, 2011.

* cited by examiner

*Primary Examiner* — Christopher Verdier
*Assistant Examiner* — Justin Seabe
(74) *Attorney, Agent, or Firm* — Oblon, McClelland, Maier & Neustadt, L.L.P.

(57) ABSTRACT

A venting pipe used to guide a gas stream in a turbojet including at least one hollow rotary shaft inside which the pipe is mounted, the pipe extending generally along an axis. The pipe includes at least two pipe segments configured to be aligned longitudinally and assembled to one another while retaining a degree of freedom in relative translation thereof, at least one of the segments including a deformable mechanism configured to deform radially as the pipe segments are tightened against one another in the shaft of the turbojet, to bear on the shaft. The pipe structure facilitates mounting of the pipe.

21 Claims, 7 Drawing Sheets

TURBOJET VENTING PIPE, METHOD FOR MOUNTING ONE SUCH PIPE AND TURBOJET PROVIDED WITH ONE SUCH PIPE

BACKGROUND OF THE INVENTION

1. Field of the Invention

The invention relates to a turbojet venting pipe, to a method for mounting such a pipe and to a turbojet provided with one such pipe.

2. Description of the Related Art

A turbine engine for an aircraft generally comprises, from upstream to downstream in the flow direction of the gases, a fan, one or more compressor stages, for example a low-pressure compressor and a high-pressure compressor, a combustion chamber, one or more turbine stages, for example a high-pressure turbine and a low-pressure turbine, and a gas exhaust nozzle. One turbine may correspond to each compressor, both being connected by a shaft, thus forming for example a high-pressure core and a low-pressure core.

A turbojet generally has, substantially at the upstream end of the high-pressure core, an "upstream compartment" containing components of the rolling bearing and gearing type. It furthermore has, substantially at the downstream end of the high-pressure core, a "downstream compartment" containing components of the rolling bearing and gearing type. These compartments are immersed in an atmosphere containing oil for lubrication of the various components. A gas flow furthermore passes through them, in particular for ventilation purposes. In order to prevent the oil from being transported out of the compartments by the gas flow, the gases are evacuated in "deoilers", which are generally formed by radial passages formed in the low-pressure shaft and on the wall of which the oil is captured in order to be reinjected into the corresponding compartment, by centrifugal effect. The deoilers communicate with a (likewise rotating) pipe referred to as a venting pipe, in the interior of which the gases are transported from the deoilers in order to be ejected at the exit of the venting pipe, generally at the nozzle of the turbojet.

The venting pipe extends inside the low-pressure shaft, concentrically therewith, the low-pressure shaft for its part extending inside the high-pressure shaft, concentrically therewith. The venting pipe rotates with the low-pressure shaft; it generally extends over a majority of the longitudinal dimension of this shaft. The venting pipe makes it possible to guide the gases and, in particular, to avoid contact of the oil-laden gases with the low-pressure shaft which, owing to the high temperature of the latter, could lead to coking phenomena of the oil in suspension in the gases.

In most known turbojets, the low-pressure shaft has a wall of variable thickness, the internal surface of its wall having a variable diameter along the shaft. The person skilled in the art conventionally refers to a so-called "bottle"-shaped shaft owing to the shape of its internal wall; the internal surface of the wall of such a shaft has a larger diameter in its central region than in its end portions.

The venting pipe generally has a wall of relatively small thickness compared with the thickness of the wall of the low-pressure shaft. Because of its slenderness, it needs a certain number of supports on the internal surface of the wall of the low-pressure shaft, not only at its ends but also in the central part. A mounting problem then arises, since the venting pipe needs to be mounted via an end of the shaft, which has a diameter less than the diameter of its central part but on the internal surface of which the pipe nevertheless needs to bear in order to ensure that it is held. This problem is solved in the prior art by using systems of conical rings and nuts which are mounted in the shaft before the pipe is mounted. These systems are complex and require sufficient clearance between the external surface of the wall of the venting pipe and the internal surface of the wall of the low-pressure shaft.

In certain recent turbojets, the diameter of the high-pressure shaft is reduced relative to that of previous turbojets. The size of the engine therefore requires that a wall of constant thickness be provided for the low-pressure shaft, with external and internal surfaces of constant diameters along the majority of the shaft, these diameters furthermore being reduced relative to those of the shafts of the prior art. The venting pipe must for its part have a diameter substantially equal to that of the venting pipes of the prior art, in order to ensure the discharge of an equivalent gas flow rate. For this reason, the space between the external surface of the venting pipe and the internal surface of the low-pressure shaft is small and makes it difficult to mount points of support. Notwithstanding, the presence of such points of support along the venting pipe remains necessary in view of its slenderness (about 2 meters in length with a diameter of 60 millimeters).

BRIEF SUMMARY OF THE INVENTION

It is an object of the invention to provide a venting pipe which is easier to mount. The invention is derived from a problem in the case of turbojets with little clearance between the venting pipe and the low-pressure shaft; nevertheless, the Applicant does not intend to limit the scope of its rights to this application alone, the invention being more generally applicable and capable of offering its advantages in any type of turbojet.

This is why the invention relates to a pipe referred to as a venting pipe for guiding a gas flow in a turbojet comprising at least one hollow rotary shaft inside which said pipe is intended to be mounted, the pipe extending overall along an axis, which pipe is characterized in that it comprises at least two pipe segments arranged in order to be assembled with one another in longitudinal alignment while retaining a degree of freedom in their relative translation, at least one segment being provided with deformable means arranged in order to deform radially when the pipe segments are tightened against one another in the shaft of the turbojet, in order to bear on the shaft.

By virtue of the invention, mounting of the pipe in the shaft is facilitated since it is under the effect of the mounting of the two pipe segments in the shaft that the deformable means deform radially in order to bear on the shaft.

In particular, the deformable means are deformed radially under the effect of a relative longitudinal displacement of the two segments with respect to one another.

Owing to their radial deformation, the diameter of the deformable means is greater after mounting than before mounting; the sleeving of the pipe segments in the shaft thus takes place with a minimal diameter of the deformable means (and is therefore facilitated), while the completion of the mounting involves the deformable means deforming radially in order to bear on the shaft so as to hold the pipe therein. A venting pipe can thus be installed easily in a reduced volume inside the shaft, without intermediate supports, while optimizing its cross section for good circulation of the gas flow and good distribution of the pressures.

Preferably, the deformable means are arranged at one end of said segment.

According to one embodiment, the deformable means have, before mounting, a diameter less than the internal diameter of the shaft. The mounting is therefore facilitated since it can take place without contact between the deformable means and the shaft.

According to one embodiment, the deformable means comprise a ring formed from deformable material, for example deformable metallic material.

According to one embodiment in this case, the ring is formed from an elastomer; such a material is highly suitable for use in a turbojet.

According to another embodiment in this case, the ring is in the form of a deformable convex annular metal plate, for example formed from nickel alloy such as Inconel X750 (registered trademark).

According to one embodiment, one end of a first segment comprises a radial bearing edge for the ring and a second segment comprises an end portion arranged in order to bear on the ring in order to compress it longitudinally against the radial edge and thus deform it radially. Such a device is easy to manufacture and install.

According to one embodiment, the segments comprise means for blocking in rotation with respect to each other (or one another) in the assembled position. It is thus simple to secure the assembly to the rotary shaft.

According to one embodiment, the pipe comprises more than two pipe segments.

According to one embodiment, the pipe segments are arranged in order to be assembled with one another jointly with their mounting in the shaft, the deformable means being arranged in order to be deformed during this assembly.

According to one embodiment, the pipe segments are arranged in order to be assembled prior to their mounting in the shaft; preassembled in this way, the pipe segments form a unitary assembly of two or more elements connected together. In this way, it is easy to handle the preassembled pipe in one unit for mounting it in the shaft, this mounting therefore being less complex, more rapid and less demanding, particularly in terms of tooling cost. Furthermore, maintenance of the assembly is facilitated since it is easy to withdraw the entire pipe from the shaft.

In this case, the segments are assembled with one another then mounted in the shaft, the deformation of the deformable means in order to come in contact with the shaft taking place during this mounting in the shaft.

The invention also relates to a turbojet comprising at least one hollow rotary shaft inside which a pipe referred to as a venting pipe for guiding a gas flow is intended to be mounted, the pipe extending overall along an axis, which pipe is characterized in that it comprises the characteristics of the pipe presented above.

The invention relates to a method for mounting a pipe referred to as a venting pipe, for guiding a gas flow inside a hollow rotary shaft of a turbojet, the pipe being intended to extend overall along an axis and comprising at least two pipe segments arranged in order to be assembled with one another in longitudinal alignment while retaining a degree of freedom in their relative translation, at least one segment being provided with deformable means, which method is characterized in that it comprises the following steps:

the pipe is mounted inside the shaft and
the deformable means are radially deformed by tightening said segments against one another, until they bear on the shaft of the turbojet in order to hold the pipe therein.

This method has the same advantages as the pipe described above.

According to one embodiment, the pipe segments are assembled with one another jointly with their mounting in the shaft, and the deformable means are deformed during this assembly.

According to another embodiment, the pipe segments are assembled with one another prior to their mounting in the shaft. In this case, the segments are assembled with one another then the pipe with its two segments is mounted in the shaft, the deformation of the deformable means in order to come in contact with the shaft taking place during this mounting.

The method may advantageously be carried out with the pipe presented above.

BRIEF DESCRIPTION OF THE SEVERAL
VIEWS OF THE DRAWINGS

The invention will be understood more clearly with the aid of the following description of the preferred embodiment of the venting pipe, the turbojet and the mounting method which correspond to the preferred embodiments of the invention, with reference to the appended plates of drawings, in which.

Figure 12:
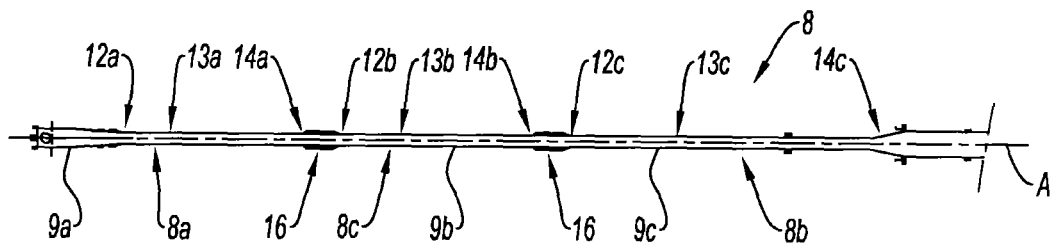
FIG. 12 represents a schematic view in section of a venting pipe according to a sixth embodiment of the invention.
Figure 15A:
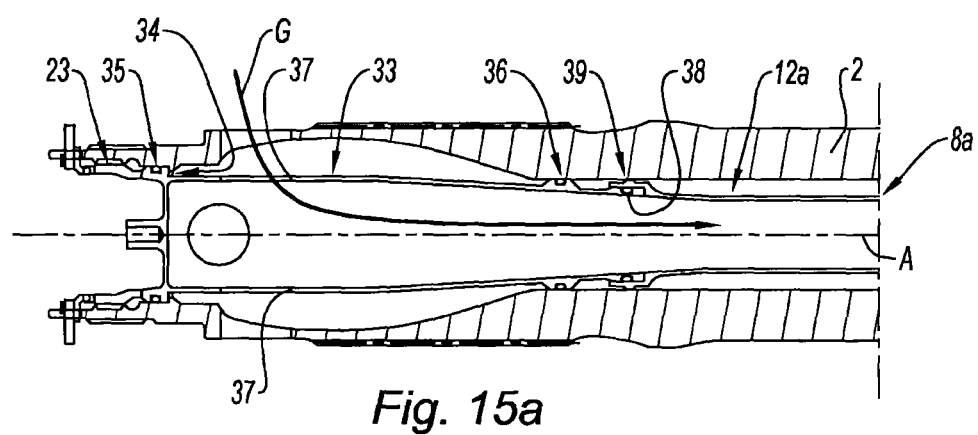
FIG. 15a represents a schematic view in section of the upstream end-piece of the venting pipe of FIG. 12, mounted in the low-pressure shaft.
Figure 15B:
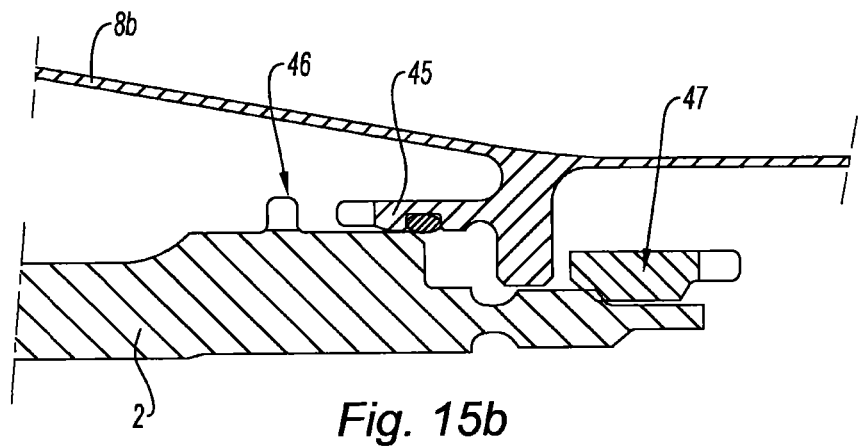
Figure 16:
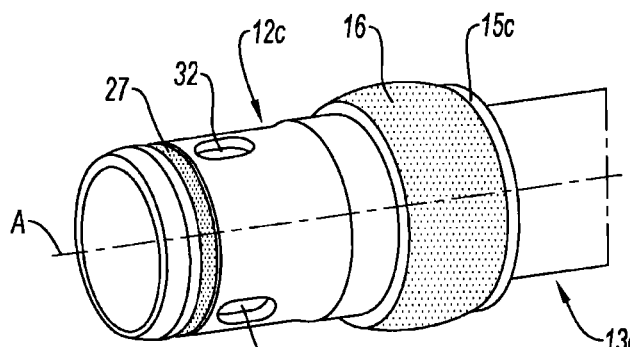
Figure 17:
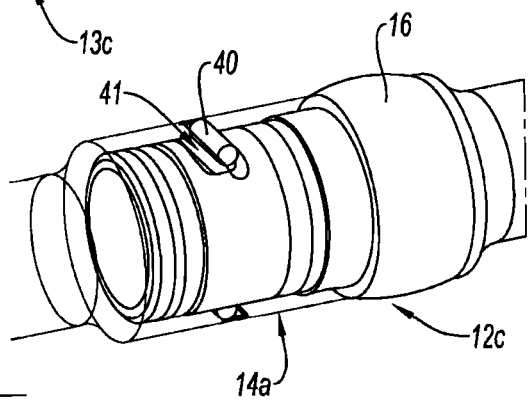
Figure 18:
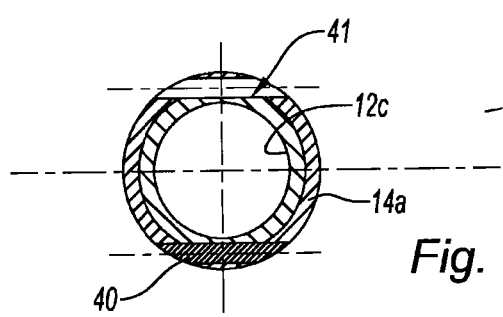
Figure 19:
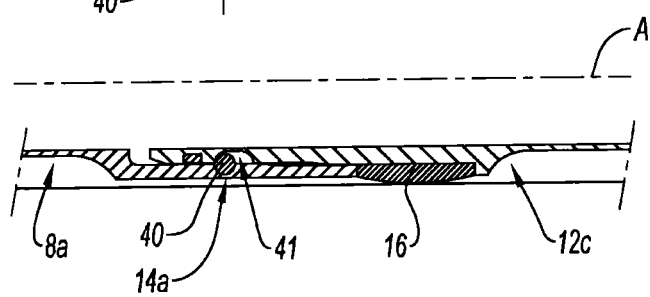
Figure 20:
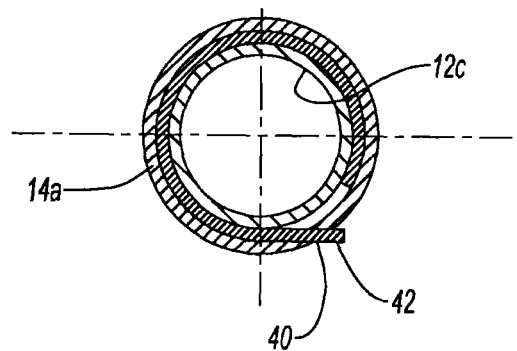
Figure 21:
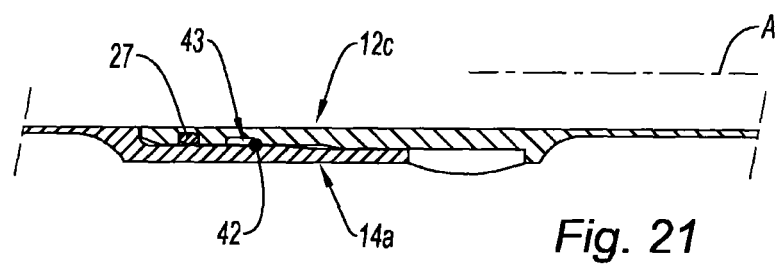

FIG. 15*b* represents a schematic view in section of the downstream part of the venting pipe of FIG. 12, mounted in the low-pressure shaft;

FIG. 16 represents a schematic perspective view of the pipe of FIG. 12;

FIG. 17 represents a schematic perspective view, partially in transparency, of a venting pipe according to a seventh embodiment of the invention;

FIG. 18 represents a schematic view in cross section of the pipe of FIG. 17;

FIG. 19 represents a partial schematic view in longitudinal section of the pipe of FIG. 17;

FIG. 20 represents a schematic view in cross section of a venting pipe according to an eighth embodiment of the invention;

FIG. 21 represents a schematic view in section of the pipe of FIG. 20 and

Figure 22:
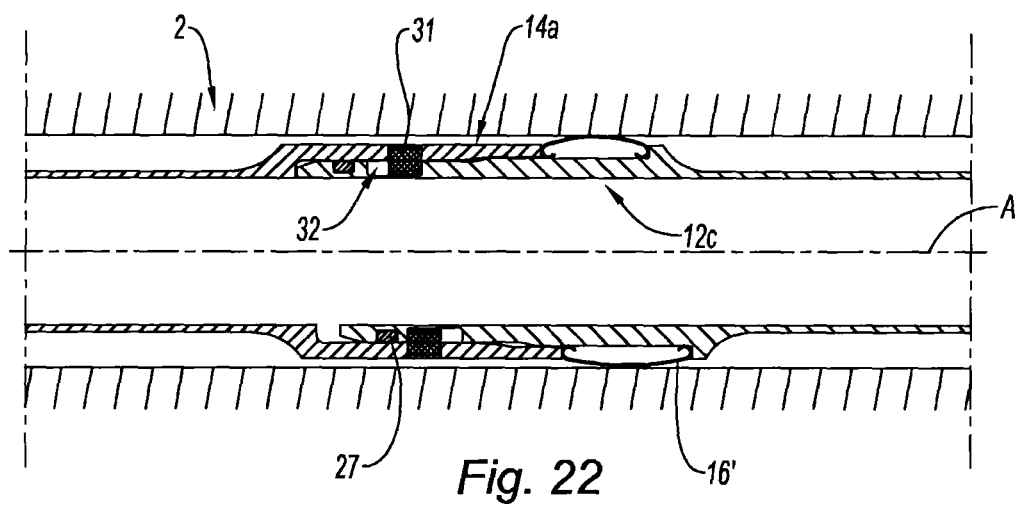

FIG. 22 represents a view in longitudinal section of the abutment region of the segments of a venting pipe according to a ninth embodiment of the invention, the lower part of FIG. 21 showing this abutment region before compression of the deformable means and the upper part of FIG. 21 showing this abutment region after compression of the deformable means.

DETAILED DESCRIPTION OF THE INVENTION

Figure 11:
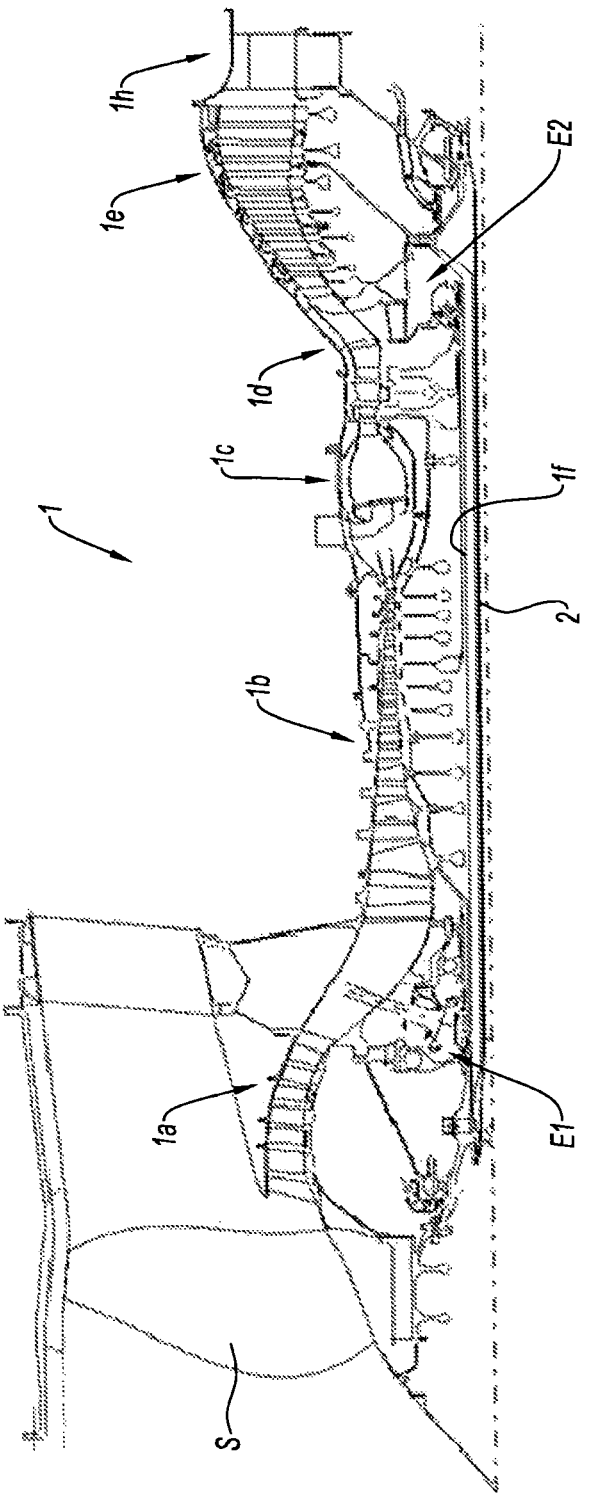
FIG. 11 represents an overall view in section of the turbojet according to a first embodiment of the invention.

Referring to FIG. 11, a turbojet 1 according to a first embodiment of the invention comprises, in the conventional way, a fan S, a low-pressure compressor 1*a*, a high-pressure compressor 1*b*, a combustion chamber 1*c*, a high-pressure turbine 1*d*, a low-pressure turbine 1*e* and an exhaust nozzle 1*h*. The high-pressure compressor 1*b* and the high-pressure turbine 1*d* are connected by a high-pressure shaft 1*f* and form therewith a high-pressure core. The low-pressure compressor 1*a* and the low-pressure turbine 1*e* are connected by a low-pressure shaft 2 and form therewith a low-pressure core. The turbojet 1 has, substantially at the upstream end of the high-pressure body, an "upstream compartment" E1 containing components of the rolling bearing and gearing type and, substantially at the downstream end of the high-pressure body, a "downstream compartment" E2 containing components of the rolling bearing type.

The low-pressure shaft 2 extends along an axis A which is the overall axis of the turbojet 1. In the rest of the description, the concepts of longitudinal or radial relate to this axis A.

Figure 1:
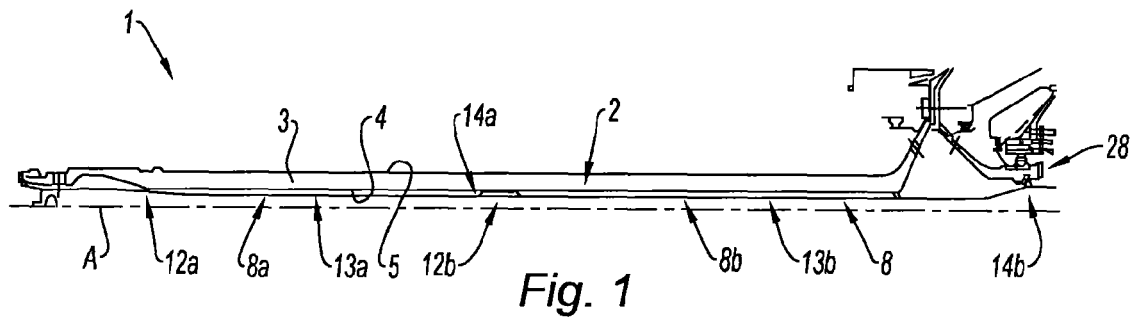
FIG. 1 represents a schematic view in section of the low-pressure shaft and of the venting pipe of the turbojet of FIG. 11.

Referring to FIG. 1, the low-pressure shaft 2 is hollow. It comprises a wall 3 with an internal surface 4 and an external surface 5. Over a majority of its length, its wall 3 has a cylindrical shape, i.e. its internal surface 4 and its external surface 5 each have a constant radius; in the case in point, the radii of the internal 4 and external 5 surfaces are constant over the entire central portion of the shaft 2, apart from its ends.

Figure 2:
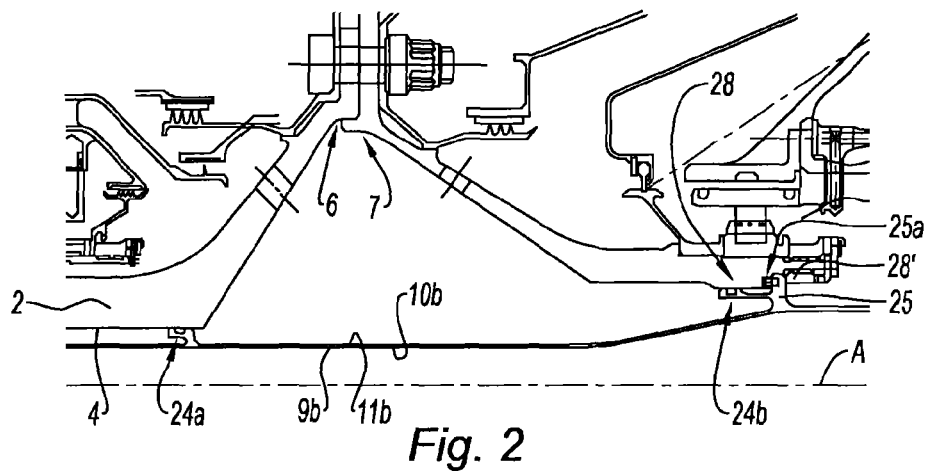
FIG. 2 represents a detailed view of the downstream portion of the low-pressure shaft of FIG. 1 during a first step of the method for mounting its venting pipe.

Referring to FIG. 2, at its downstream end the low-pressure shaft 2 comprises a portion whose diameter increases rapidly in the downstream direction and ends in a flange 6 for fastening to a flange 7 connecting the journal 28 of the low-pressure turbine 1*e* to the low-pressure shaft 2, in a known fashion.

Inside the low-pressure shaft 2 and concentrically therewith extends a venting pipe 8, the function of which is to guide downstream the gas flows coming from the upstream compartment E1 of the turbojet, this function being known, as explained in the introduction.

The venting pipe 8 extends along the axis A of the turbojet 1. It is hollow and has symmetry of revolution, in the case in point with an overall cylindrical shape.

It comprises a plurality of segments, in the case in point two segments 8*a*, 8*b*, an upstream segment 8*a* and a downstream segment 8*b*. Each of its segments 8*a*, 8*b* is hollow and comprises a wall 9*a*, 9*b* with an internal surface 10*a*, 10*b* and an external surface 11*a*, 11*b*. The segments 8*a*, 8*b* are arranged in order to be assembled with one another, in the case in point at the central part of the low-pressure shaft 2.

Each segment 8*a*, 8*b* (FIG. 1) comprises an upstream end portion 12*a*, 12*b*, a central portion 13*a*, 13*b* and a downstream end portion 14*a*, 14*b*. The central portion 13*a*, 13*b* of each of the segments 8*a*, 8*b* is in this case cylindrical and regular, only the upstream 12*a*, 12*b* and downstream 14*a*, 14*b* end portions having particular shapes for assembly with another segment or with the low-pressure shaft 2.

More precisely, the upstream segment 8*a* comprises, at its downstream end, a downstream end skirt 14*a* (forming its downstream end portion 14*a*) with a diameter slightly greater than the diameter of its central part 13*a*; more precisely, the internal surface 10*a* of the wall 9*a* of the upstream segment 8*a* at the skirt 14*a* has a diameter greater than its diameter in the central part 13*a* of the segment 8*a*. The thickness of the wall 9*a* of the segment 8*a* at the skirt 14*a* is also slightly greater than its thickness in the central part 13*a* of the segment 8*a*.

The upstream end portion 12*b* of the downstream segment 8*b* has a thickness greater than that of its central part 13*b*. The downstream segment 8*b* furthermore comprises a radial edge 15*b* at the downstream end of its upstream end portion 12*b*.

The upstream 8*a* and downstream 8*b* segments are arranged in order to be assembled with one another in longitudinal alignment, i.e. abutting one another and more precisely sleeved at their downstream 14*a* and upstream 12*b* end portions, respectively. In the case in point, the upstream end portion 12*b* of the downstream segment 8*b* is sleeved into the downstream end skirt 14*a* of the upstream segment 8*a*, the diameter of the internal surface 10*a* of the wall 9*a* of the upstream segment 8*a* at its skirt 14*a* being substantially equal to (slightly greater than) the diameter of the external surface 11*b* of the wall 9*b* of the downstream segment 8*b* at its upstream end portion 12*b*.

A ring 16 of deformable material is mounted at the interface between the segments 8*a*, 8*b*. It is in this case a ring of elastomer, for example an elastomer of the fluorocarbon type (for example of category 64C8, 64C6 or 60C7), an elastomer of the nitrile type (for example of category 21A7 or 21A8), an elastomer of the ethylene-propylene type (for example of category 41B8) or an elastomer of the polyurethane type. The material forming the ring 16 is selected as a function of its mechanical characteristics (deformation, hardness, thermal stability), its compatibility with various fluids (such as the synthetic oil and the fuel) and its resistance to atmospheric agents. Other materials satisfying the constraints defined by the person skilled in the art may of course be suitable, if they are deformable.

The ring 16 has an internal surface 17, an external surface 18, an upstream surface 19 and a downstream surface 20. In the case in point, the ring 16 is preformed so that its external surface 18 has a convex shape. More precisely in the case in point, the ring 16 is sleeved over the upstream end portion 12*b* of the downstream segment 8*b*, its downstream surface 20 bearing on (and in the case in point adhesively bonded to) the upstream surface of the edge 15*b*. The ring 16 may be mounted with force on the downstream segment 8*b* or mounted with clearance, with or without adhesive bonding.

The ring 16 is arranged so that, before assembly of the segments 8*a*, 8*b* with one another, its external surface 18 has a radius R1 less than the radius R2 of the internal surface 4 of the low-pressure shaft 2, in the case in point a radius R1 substantially equal to (slightly greater than in the central part) the external radius of the edge 15*b*. In other words, the ring 16 is arranged in order to be mounted with clearance in the low-pressure shaft 2. The ring 16 is arranged in order to be deformed during the assembly of the segments 8*a*, 8*b* with one another in order to bear on the low-pressure shaft 2 and thus form a supporting portion of the venting pipe 8 on the low-pressure shaft 2. More precisely, the ring 16 is arranged so that its external surface 18 bears on the internal surface 4 of the low-pressure shaft 2. This deformation results from the compression of the ring 16 when the upstream segment 8*a* is sleeved onto the downstream segment 8*b*, the radii of their sleeved portions (downstream portion 14*a* of the upstream segment 8*a* and upstream portion 12*b* of the downstream segment 8*b*) being shaped so that their sleeving by relative longitudinal translation is possible only by displacing the upstream surface 19 of the ring 16 in translation downstream, the downstream surface 20 for its part being blocked in longitudinal translation by the radial edge 15*b*, which imparts radial deformation to the ring 16. In other words, the ring 16 is radially deformed because of a longitudinal compression force of the ring 16 between the segments 8*a*, 8*b* and more precisely between the downstream end of the upstream segment 8*a* and the edge 15*b* of the downstream segment 8*b*.

The method for mounting the venting pipe 8 in the low-pressure shaft 2 will now be described in more detail, with reference more particularly to FIGS. 2 to 5.

Referring to FIG. 2, in a first step, the downstream segment 8*b* is mounted in the low-pressure shaft 2, via the downstream part thereof. The downstream segment 8*b* comprises at least one sealing means, in the case in point two circumferential seals 24*a*, 24*b* arranged in order to bear on corresponding zones of the internal surface 4 of the low-pressure shaft 2. More precisely, the second seal 24*b* bears on the journal 28 of the low-pressure turbine 1*e* connected to the low-pressure shaft 2 by means of the fastening flanges 6, 7. The downstream segment 8*b* comprises a circumferential stop rib 25 arranged in order to abut on the journal 28 of the low-pressure turbine 1*e*. By virtue in the case in point of a system 25*a* comprising pins and recesses, the abutment of the rib 25 on the journal 28 of the low-pressure turbine 1*e* makes it possible to fulfill an antirotation function, that is to say to prevent rotation of the downstream segment 8*b* relative to the low-pressure shaft 2, by means of the journal 28 of the low-pressure turbine 1*e*. Furthermore, the downstream segment 8*b* is blocked in translation relative to the low-pressure shaft 2 by a nut 28' which blocks its stop 25 in translation in the downstream direction.

Figure 3:
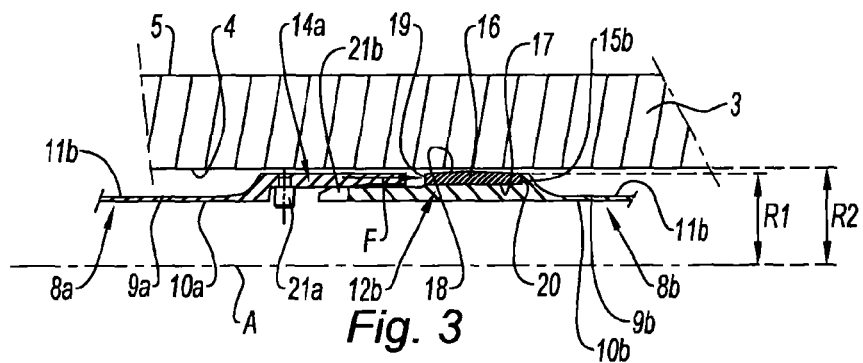
FIG. 3 represents a view in section of the abutment region of the segments of the venting pipe of the low-pressure shaft of FIG. 1 during a second step of its mounting method.

In a second step, referring to FIG. 3, the upstream segment 8*a* is sleeved via the upstream end of the low-pressure shaft 2 and translated in the direction of the downstream segment 8*b*, as indicated by the arrow F. More precisely in the case in point, after the downstream segment 8*b* has been mounted in the low-pressure shaft 2, the upstream segment 8*a* is inserted by translation into the low-pressure shaft 2 and, during this translation, its downstream end 14*a* approaches the end 12*b* of the downstream segment 8*b*.

Figure 4:
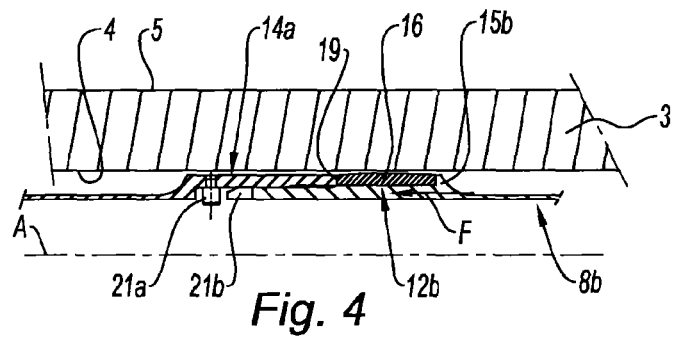
FIG. 4 represents a view in section of the abutment region of the segments of the venting pipe of the low-pressure shaft of FIG. 1 during a third step of its mounting method.

In a third step, referring to FIG. 4, the segments 8*a*, 8*b* are brought further toward one another by relative translation and the downstream end of the downstream end portion 14*a* of the upstream segment 8*a* comes in contact with the upstream surface 19 of the ring 16.

Figure 5:
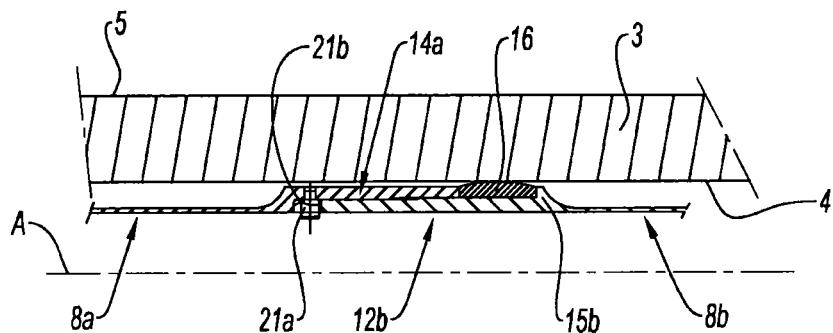
FIG. 5 represents a view in section of the abutment region of the segments of the venting pipe of the low-pressure shaft of FIG. 1 during a fourth step of its mounting method.

In a fourth step, referring to FIG. 5, the translation is continued and the downstream end of the downstream end portion 14*a* of the upstream segment 8*a* bears on the ring 16 (and more precisely on its upstream surface 19), the effect of which is to radially deform the ring 16, of which the radius of the external surface 18 consequently increases, as explained above. The translation of the segments 8*a*, 8*b* with respect to one another is continued until the external surface 18 of the ring 16 bears against the internal surface 4 of the low-pressure shaft 2, as can be seen in FIG. 5, this bearing being dimensioned in order to be exerted along a surface sufficient to fulfill the function which is assigned to it; in the case in point, the position of the segments 8*a*, 8*b* with respect to one another (and therefore the compression of the ring 16) is regulated by abutment of the upstream end of the upstream portion 12*b* of the downstream segment 8*b* on a corresponding supporting surface of the downstream end of the downstream portion 14*a* of the upstream segment 8*a*).

In order to facilitate and guide the translation of the upstream 8*a* and downstream 8*b* segments with respect to one another, a guiding tool may be used, for example an internal tube having the same diameter as the smallest internal diameter of the upstream 8*a* and downstream 8*b* segments, the guiding tool being withdrawn after mounting of the upstream 8*a* and downstream 8*b* segments.

The segments 8*a*, 8*b* are arranged in order to be secured in rotation after their assembly; to this end, they have means for securing in rotation. In the case in point, the downstream end portion 14*a* of the upstream segment 8*a* comprises a pin 21*a* arranged in order to be accommodated in a notch 21*b* of the upstream end portion 12*b* of the downstream segment 8*b*, in order to secure the segments 8*a*, 8*b* in rotation. The pin 21*a* is in the case in point fastened in an adapted housing of the downstream end portion 14*a* of the upstream segment 8*a*. In order to be able to assemble the segments 8*a*, 8*b* together, and more precisely sleeve their downstream 14*a* and upstream 12*b* end portions with one another, the antirotation pin 21*a* and its housing notch 21*b* must be aligned, so that the pin 21*a* can be received in the notch 21*b*, without which the pin 21*a* prevents any translation movement of the segments 8*a*, 8*b* toward one another once it is in contact with the upstream end of the upstream portion 12*b* of the downstream segment 8*b*. Thus, during the third (or fourth) step, the downstream segment 8*b* is, if necessary, driven in rotation about its axis A in order to align the pin 21*a* and the notch 21*b*. In the case in point, in the representation of FIG. 4 (start of the contact between the downstream end of the upstream segment 8*a* and the upstream surface 19 of the ring 16), the pin 21*a* has not yet started to be inserted into its housing notch 21*b* but is in proximity thereto; it is therefore during the fourth step described above that the pin 21*a* is inserted into its housing 21*b*.

According to an embodiment which is not represented, the downstream segment 8*b* comprises a plurality of notches 21*b*; it is thus easier to align the pin 21*a* with a notch 21*b*; notches 21*b* may be distributed over the entire periphery of the segment 8*b* or only over a portion thereof.

Figure 6:
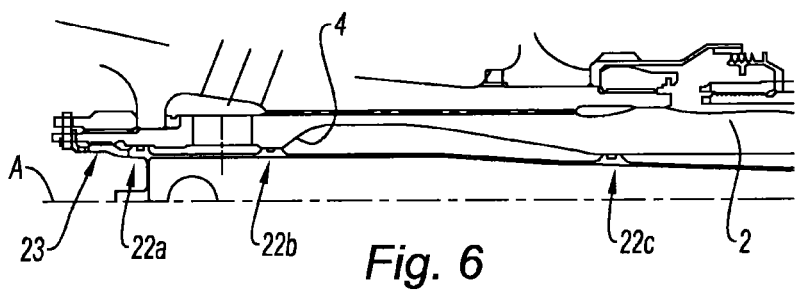
FIG. 6 represents a view in section of the upstream region of the low-pressure shaft of FIG. 1.

Referring to FIG. 6, once the desired position for the upstream segment 8*a* has been reached, the latter is blocked in translation with respect to the low-pressure shaft 2 by virtue of a nut 23 fastened to its upstream end. This axial blocking nut 23 may also fulfill a function of blocking in rotation. It will be noted in FIG. 6 that the upstream portion 12*a* of the upstream segment 8*a* comprises at least one sealing means (in the case in point three circumferential seals 22*a*, 22*b*, 22*c*) bearing on corresponding zones of the internal surface 4 of the low-pressure shaft 2. More precisely, the function of the seal 22*b* is to avoid introduction of oil or oil-laden air into the internal cavity 4 of the upstream region of the low-pressure shaft 2.

Alternative embodiments will be described with reference to FIGS. 7 to 22. In these embodiments, the same numerical references are used for elements with a structure or function which is identical, equivalent, similar or comparable to those of the elements of the turbojet of FIGS. 1 to 6, in order to simplify the description. Furthermore, not all of the description of the venting pipe of FIGS. 1 to 6 is necessarily repeated, this description applying to the venting pipe of FIGS. 7 to 22 when there are no incompatibilities. Only the significant structural and functional differences will be described.

Figure 7:
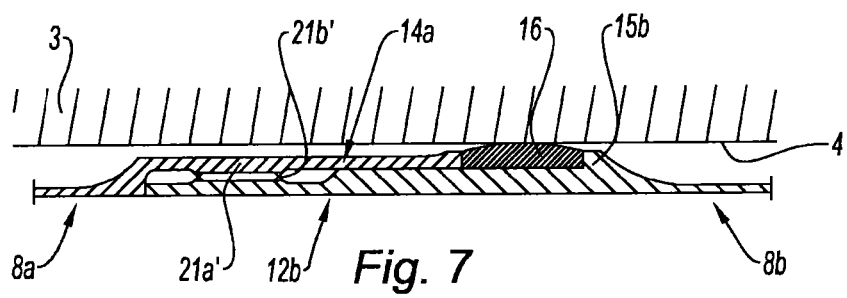
FIG. 7 represents a view in section of the abutment region of the segments of a venting pipe according to a second preferred embodiment of the invention.

Referring to FIG. 7, according to a second embodiment, the upstream segment 8a and the downstream segment 8b are secured in rotation by virtue of longitudinal splines 21a', 21b' respectively arranged on the downstream 14a and upstream 12b portions of these segments 8a, 8b. These splines 21a', 21b' are enmeshed in a manner known per se in order to secure the two segments 8a, 8b in rotation.

Of course, other means for securing the segments 8a, 8b in rotation and/or in translation with one another may be envisioned. For example, their downstream 14a and upstream 12b ends could be threaded and screwed to one another, in which case blocking in rotation is furthermore ensured.

Figure 8:
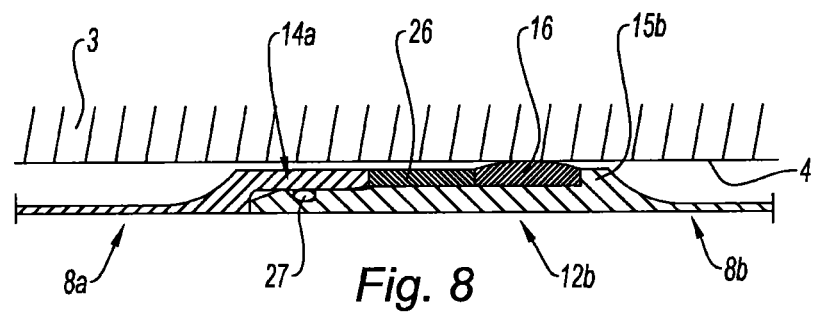
FIG. 8 represents a view in section of the abutment region of the segments of a venting pipe according to a third preferred embodiment of the invention.

Referring to FIG. 8, according to a third embodiment, a rigid intermediate ring 26 is mounted between the deformable ring 16 and the downstream end 14a of the upstream segment 8a; such a rigid ring 26 makes it possible to hold the deformable ring 16 in position. It is, for example, adhesively bonded to the deformable ring 16 on their contact faces. The rigid ring 26 slides over the downstream segment 8b during the displacement of the upstream segment 8a and the compression of the deformable ring 16, the upstream segment 8a transmitting its compression forces to the ring 16 via the rigid ring 26.

Furthermore, in this embodiment, in proximity to the upstream end of its upstream end portion 12b, the downstream segment 8b comprises a sealing joint 27 housed in a groove and arranged in order to be compressed radially between the upstream segment 8a and the downstream segment 8b in order to avoid a possible gas leak in a possible clearance between these two segments 8a, 8b.

Figure 9:
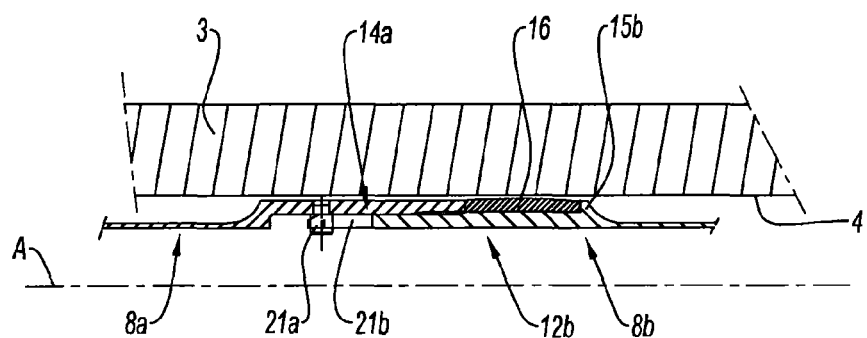
FIG. 9 represents a view in section of the abutment region of the segments of a venting pipe according to a fourth preferred embodiment of the invention.

Referring to FIG. 9, according to a fourth embodiment, the segments 8a, 8b comprise means for securing in rotation of the pin/notch type as in the embodiment of FIGS. 1 to 6, although the dimensioning of the various elements is such that the pin 21a is engaged in the notch 21b before compression of the deformable ring 16. The benefit is that the angular position of the two segments 8a, 8b with respect to one another is easier to achieve and is not interfered with by the compression of the ring 16 (which could hinder the rotation of the segments 8a, 8b with respect to one another).

Figure 10:
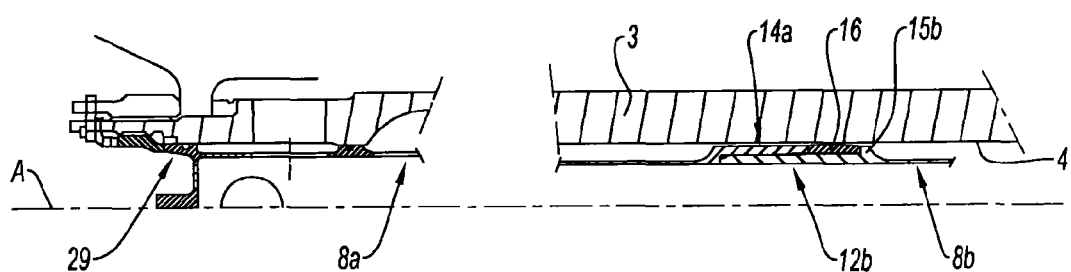
FIG. 10 represents a view in section on the one hand of the abutment region and on the other hand of the upstream portion of the segments of a venting pipe according to a fifth preferred embodiment of the invention.

Referring to FIG. 10, according to a fifth embodiment, the segments 8a, 8b are not secured in rotation directly to one another but are secured in rotation with the low-pressure shaft 2 by independent means. Thus, in the case in point, the downstream segment 8b is secured in rotation with the low-pressure shaft 2 by a system 25a of pins and a recess at its abutment flange 25 (as described with reference to FIG. 2) while the upstream segment 8a is secured in rotation by virtue of adapted means 29 at its upstream end, in the case in point an arrangement of pins and recesses (as described above) or catches and notches at the abutment flange of its upstream end. One benefit of not having means for blocking the segments 8a, 8b in rotation at their interface is that these segments 8a, 8b can be mounted "blind", that is to say without paying attention to their respective angular positions.

The invention has been presented in the preceding embodiments in relation to a venting pipe 8 formed by two segments 8a, 8b. Of course, the venting pipe 8 may comprise a number of segments 8a, 8b greater than two, in which case a point of bearing with the low-pressure shaft 2 may be formed at the interface between each pair of successive segments. The selected number of segments depends in particular on the length of the venting pipe 8 and the desired number of supports on the low-pressure shaft 2. The blocking of the various segments in rotation with respect to the low-pressure shaft 2 may be carried out by blocking the successive segments in rotation with respect to one another and/or directly between some (or all) segments and the low-pressure shaft 2.

Furthermore, the invention has been presented with mounting of the downstream segment 8b before the upstream segment 8a. Depending on the structure of the turbojet, this order may be reversed.

The invention has been presented with a deformable ring 16 mounted on the downstream segment 8b of the venting pipe 8, although it is clear that it may be mounted on the upstream segment 8a.

Referring to FIG. 12, a sixth embodiment of the invention is presented in which the segments of the pipe 8 are arranged so that they can be preassembled before they are mounted in the low-pressure shaft 2. In the embodiment described, the venting pipe 8 comprises three segments, an upstream segment 8a, a downstream segment 8b and an intermediate segment 8c which extends between the upstream 8a and downstream 8b segments; this embodiment may of course be envisioned with two segments or more than three segments.

As for the preceding embodiments, each of its segments 8a, 8b, 8c comprises an upstream end portion 12a, 12b, 12c, a central portion 13a, 13b, 13c and a downstream end portion 14a, 14b, 14c. Each of its segments 8a, 8b, 8c is hollow and comprises a wall 9a, 9b, 9c with an internal surface 10a, 10c and an external surface 11a, 11c (only the surfaces of the upstream 8a and intermediate 8c segments are referenced in the figures). The central portion 13a, 13b, 13c of each of the segments 8a, 8b, 8c is in this case cylindrical and regular in shape, only the upstream 12a, 12b, 12c and downstream 14a, 14b, 14c end portions having particular shapes for assembly with another segment or the low-pressure shaft.

The upstream 8a and intermediate 8c segments are arranged in order to be assembled with one another in longitudinal alignment, i.e. abutting with one another and more precisely sleeved at their downstream 14a and upstream 12c end portions, respectively. The intermediate 8c and downstream 8b segments are arranged in order to be assembled with one another in the same way, at their downstream 14c and upstream 12b end portions, respectively.

As above, a ring 16 of deformable material is mounted at each of the interfaces between the pairs of segments (8a, 8c), (8c, 8b).

According to the particular characteristic of this sixth embodiment, the segments 8a, 8b, 8c are arranged so that they can be assembled with one another before they are mounted in the low-pressure shaft 2. Prior assembly of the segments 8a, 8b, 8c is intended to mean that the segments 8a, 8b, 8c are assembled beforehand, i.e. connected to one another, in relative positions corresponding substantially to their positions in operation, except for the fact that the rings 16 are not yet (fully) deformed; slight prior deformation may be envisioned so long as it does not prevent mounting of the pipe 8 in the low-pressure shaft 2. The rings 16 are deformed during the mounting of the pipe 8 in the low-pressure shaft 2 in order to form supports on this shaft 2. By virtue of the preassembly, it is possible to handle the pipe 8, comprising its three pipe segments 8a, 8b, 8c, straightforwardly and in a single unit.

The abutment region of the upstream segment 8a and of the downstream segment 8c will now be described with reference to FIG. 13. This description applies mutatis mutandis to the abutment region between the intermediate segment 8c and the downstream segment 8b, these abutment regions being similar in the case in point.

Figure 13:
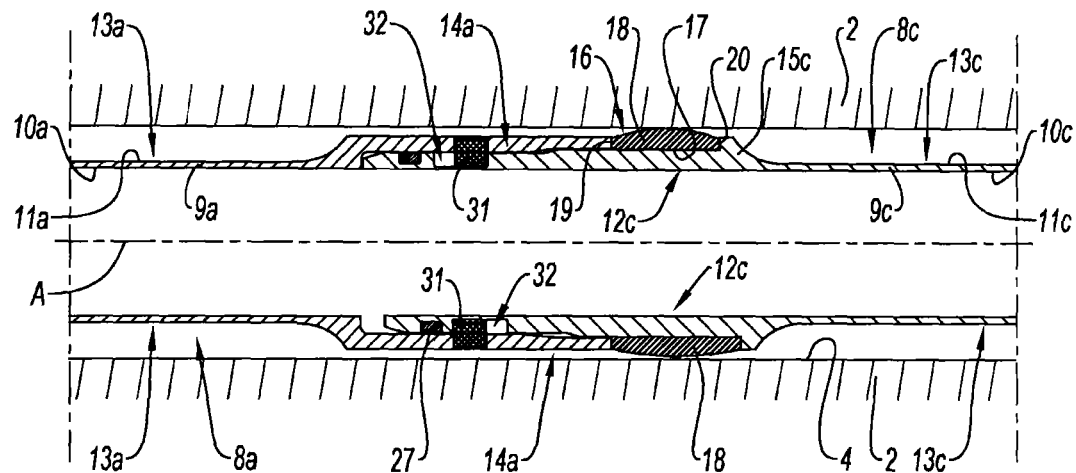
FIG. 13 is a view in section of the abutment region of the upstream and intermediate segments of the venting pipe of FIG. 12, the lower part of FIG. 13 showing this abutment region before compression of the deformable means and the upper part of FIG. 13 showing this abutment region after compression of the deformable means.
Figure 14:
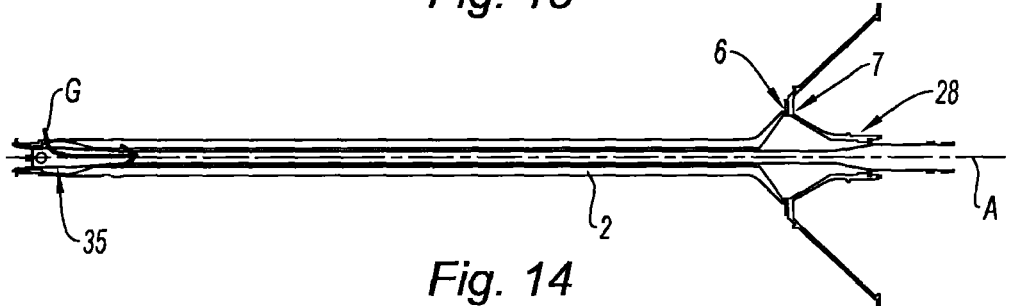
FIG. 14 represents a schematic view in section of the low-pressure shaft and of the venting pipe of FIG. 12.

More precisely, referring to FIG. 13, the upstream segment 8a comprises, at its downstream end, a downstream end skirt 14a (forming its downstream end portion 14a) with a diameter slightly greater than the diameter of its central part 13a; more precisely, the internal surface 10a of the wall 9a of the upstream segment 8a at the skirt 14a has a diameter greater than its diameter in the central part 13a of the segment 8a. The thickness of the wall 9a of the segment 8a at the skirt 14a is also slightly greater than its thickness in the central part 13a of the segment 8a.

Furthermore, the upstream end portion 12c of the intermediate segment 8c has a thickness greater than that of its central part 13c. The intermediate segment 8c furthermore comprises a radial edge 15c at the downstream end of its upstream end portion 12c.

The upstream end portion 12c of the intermediate segment 8c is sleeved into the downstream end skirt 14a of the upstream segment 8a, the diameter of the internal surface 10a of the wall 9a of the upstream segment 8a at its skirt 14a being substantially equal to (slightly greater than) the diameter of the external surface 11c of the wall 9c of the intermediate segment 8c at its upstream end portion 12c.

A ring 16 of deformable material is mounted at the interface between the segments 8a, 8c. The ring 16 has an internal surface 17, an external surface 18, an upstream surface 19 and a downstream surface 20. In the case in point, the ring 16 is preformed so that its external surface 18 has a convex shape. More precisely in the case in point, the ring 16 is sleeved over the upstream end portion 12c of the intermediate segment 8c, its downstream surface 20 bearing on (and in the case in point adhesively bonded to) the upstream surface of the edge 15c. The ring 16 may be mounted with force on the intermediate segment 8c or mounted with clearance, with or without adhesive bonding.

The upstream 8a and intermediate 8c segments are assembled with one another with the aid of pins 31, in the case in point three in number regularly distributed angularly. Each pin 31 is secured to the downstream skirt 14a of the upstream segment 8a and is, to this end, mounted with force in an orifice thereof. It is furthermore received in a housing forming a slideway 32, formed in the opposing surface of the upstream portion 12c of the intermediate segment 8c; this slideway 32 allows the segments 8a, 8c to slide with respect to one another but only in the longitudinal dimension of the slideway 32. Thus, by virtue of the pins 31, the segments 8a, 8c are assembled with one another, blocked in rotation with respect to one another and free to slide with respect to one another but only along an excursion corresponding to the length of the slideway 32. A sealing joint 27 is housed in a groove and arranged in order to be compressed radially between the upstream segment 8a and the intermediate segment 8c in order to avoid a possible leak of gas in a possible clearance between these two segments 8a, 8c.

The pipe 8 with its assembled segments 8a, 8b, 8c can be handled as a unitary object of which the various components are connected to one another, the only degree of freedom being the longitudinal translation between the segments 8a, 8b, 8c, but only in the dimension of the slideway 32. The handling of the pipe 8 as a single unit is therefore easy, which facilitates its mounting in the low-pressure shaft 2.

As can be seen in FIG. 13, when the pipe 8 is threaded into the shaft 2, the rings 16 are not compressed, their exterior surfaces 18 therefore having a maximum exterior diameter less than the diameter of the internal surface 4 of the low-pressure shaft 2. Subsequently, during its mounting in the shaft 2, the pipe 8 is longitudinally constrained which causes the segments 8a, 8b, 8c to approach one another and compress the rings 16 at their interfaces, these rings 16 thus forming supports on the internal surface 4 of the low-pressure shaft 2, as in the preceding embodiments.

As previously, circumferential joints are arranged in order to bear on corresponding zones of the internal surface 4 of the low-pressure shaft 2, and more precisely in particular on the journal 28 of the low-pressure turbine 1e connected to the low-pressure shaft 2 by means of the fastening flanges 6, 7.

It will furthermore be noted in the case in point that the pipe 8 is fastened on its upstream side (which corresponds to the upstream portion 12a of the upstream segment 8a) to an upstream end-piece 33 intended to be fastened on the upstream side of the low-pressure shaft 2. The end-piece 33 comprises antirotation means (for example lugs) 34 arranged in order to cooperate with corresponding means (for example housings) of the low-pressure shaft 2 in order to fix the angular position of the end-piece 33 with respect to the low-pressure shaft 2. The end-piece 33 furthermore comprises sealing joints 35, 36, one 35 on the upstream side of the end-piece 33 and the other 36 on its downstream side, on either side of openings 37 allowing the gases G coming from the upstream oil compartment E1 of the turbojet 1 to pass through. The end-piece 33 is fastened to the low-pressure shaft 2 with the aid of an upstream nut 23.

It will be noted in passing that the end-piece 33 is in this case a separate piece of the pipe 8, in contrast to the embodiments described with reference to FIGS. 1 to 11 in which this end-piece is formed directly by the upstream segment of the pipe 8, integral therewith.

The upstream portion 12a of the upstream segment 8a is sleeved over the downstream portion of the upstream end-piece 33, the end of the upstream portion 12a of the upstream segment 8a comprising mounting bosses 39 making it possible to consolidate the position of all the elements, by placing the upstream segment 8a in pressure between the low-pressure shaft 2 and the upstream end-piece 33; the radial dimension of these bosses 39 is 0.56 mm in the case in point. A sealing joint 38 is provided between the upstream end-piece 33 and the upstream segment 8a.

The mounting method is, in a simplified way, as follows:
the segments 8a, 8b, 8c of the pipe 8 are assembled with one another;
the upstream end-piece 33 is mounted from the upstream side of the low-pressure shaft 2 and fastened in position by virtue of the upstream nut 23;
the pipe 8 is mounted from the downstream side of the low-pressure shaft 2, the segments 8a, 8b, 8c being forced to slide with respect to one another in the dimension of the slideways 32 (in the case in point with identical lengths) in order to compress the rings 16 and deform them so that they form points of bearing on the low-pressure shaft 2;
the pipe 8 is fastened in position by its downstream end, allowing the mounting to be completed.

On the downstream side, the fastening preferably takes place by virtue of antirotation means, in the case in point lugs 45, of the downstream portion 14b of the downstream segment 8b, which are arranged in order to cooperate with antirotation means, in the case in point corresponding housings 46, of the low-pressure shaft 2.

The displacement of the segments 8a, 8b, 8c with respect to one another is obtained in the case in point by virtue of a downstream nut 47 making it possible, by screwing it, to push the downstream segment 8b of the pipe 8 in the upstream direction and therefore compress the rings 16 against the low-pressure shaft 2. Once the downstream nut 47 has been fully screwed, the assembly is fixed in position, the antirotation lugs 45 being blocked in the corresponding recesses 46 of the pressure shaft 2.

The various antirotation elements provided on the various pieces of the assembly make it possible to avoid any risk of twisting these pieces, in particular the segments 8a, 8b, 8c.

Referring to FIGS. 17 to 19, a means equivalent to the pins 31 of the embodiment of FIGS. 12 to 16 is described. In this embodiment, transverse rods 40 are fixed with force into corresponding housings of the downstream portion 14a of the upstream segment 8a (or of the downstream portion 14c of the intermediate segment 8c), these rods 40 being arranged in order to be received in housings 41 forming slideways, which are formed in the upstream portion 12c of the intermediate segment 8c (or in the upstream portion 12a of the downstream segment 8b). As previously, the cooperation of the rods 40 with their housings 41 makes it possible to secure the segments 8a, 8c in rotation and in translation with freedom of movement in the longitudinal dimension of the housings forming slideways 41. In the case in point, the pipe 8 comprises two diametrically opposite rods 40 at each interface between two segments (8a, 8c), (8c, 8b); a single rod or more than two rods could be provided.

Referring to FIGS. 20 and 21, another means equivalent to the pins 31 of the embodiment of FIGS. 12 to 16 is described. In this embodiment, a toric rod 42 is fixed in a corresponding peripheral housing of the downstream portion 14a of the upstream segment 8a (or of the downstream portion 14c of the intermediate segment 8c), this rod 42 being arranged in order to be received in a housing 43 forming a slideway, which is formed in the upstream portion 12c of the intermediate segment 8c (or in the upstream portion 12b of the downstream segment 8b). The toric rod 42 is rolled up in its housing through an orifice 44 and extends circumferentially (and therefore circularly) once in position (it is seen while being rolled up in FIG. 20). The cooperation of the rod 42 with its housing 43 makes it possible to secure the segments 8a, 8c in translation with freedom of movement in the longitudinal dimension of the slideway 41. Prevention of rotation of the segments 8a, 8c with respect to one another is ensured in the case in point when all of the venting pipe 8 and the end-piece 33 are permanently secured by the upstream 23 and downstream 47 nuts, so that the deformable ring 16 bears on the internal surface 4 of the turbine shaft 2, thus blocking the degree of rotation of the pipes 8a, 8c.

The embodiment of FIG. 22 is identical to that of FIGS. 12 to 16, with the only difference that the deformable means is formed not from elastomer but from deformable metallic material. In the case in point, it is a metallic bearing joint 16', which in the case in point is in the form of a convex annular metal plate 16'; this metallic bearing joint 16' thus has a hollow annular shape and comprises a convex wall between two annular curved edges 16'a, 16'b. Under the effect of a longitudinal constraint (between adjacent segments (8a, 8c), (8c, 8b)), the metallic bearing joint 16' deforms radially (changing from its shape at the bottom of FIG. 22 to its shape at the top of FIG. 22) in order to form a radial support on the low-pressure shaft. Since it is metallic, the metallic bearing joint 16' can withstand high temperatures; it may for example be formed from nickel alloy such as Inconel X750 (registered trademark), which can withstand temperatures of the order of 500 or 600° C. Such an embodiment of the deformable means 16, 16' between two segments (8a, 8b), (8a, 8c), (8b, 8c) may of course be applied to all the embodiments described. The selection of the material of the rings 16, 16' makes it possible to cover a wide range of possible working temperature, from a cold temperature to a temperature in the case in point substantially equal to 600°.

In the various embodiments, the various toric bearing joints for the segments 8a, 8b, 8c of the pipe 8 or its upstream end-piece 33 may also be replaced by metallic bearing joints, formed for example from cast-iron, making it possible to cover temperatures up to about 600° C.

The invention has been described with reference to preferred embodiments, although it is clear that other embodiments may be envisioned.

In particular, the characteristics of the various embodiments described may be combined together, if they are not incompatible.

The invention claimed is:

1. A pipe for guiding a gas flow in a turbojet including a hollow rotary shaft inside which the pipe is configured to be mounted, the pipe extending overall along an axis, the pipe comprising:
   first and second pipe segments configured to be assembled with one another in longitudinal alignment while retaining a degree of freedom in relative translation, the first and second pipe segments each including an upstream end portion, a central portion, and a downstream end portion, and the first pipe segment being disposed upstream of the second pipe segment; and
   a deformable ring configured to deform radially when the pipe segments are tightened against one another in the hollow rotary shaft of the turbojet, to bear on the hollow rotary shaft,
   wherein a diameter of the downstream end portion of the first pipe segment is greater than a diameter of a diameter of the central portion of the first pipe segment,
   wherein a downstream end of the upstream end portion of the second pipe segment includes a radial edge, a downstream surface of the deformable ring abutting the radial edge,
   wherein, in an unassembled state, an external surface of the deformable ring presents a radius that is less than a radius of an internal surface of the hollow rotary shaft,
   wherein, in an assembled state, the upstream end portion of the second pipe segment is sleeved into the downstream end portion of the first pipe segment and the deformable ring is compressed between the radial edge and a downstream free end of the downstream end portion of the first pipe segment such that the deformable ring deforms and the external surface of the deformable ring abuts the internal surface of the hollow rotary shaft.

2. The pipe as claimed in claim 1, wherein the upstream end portion of the first pipe segment includes a seal member.

3. The pipe as claimed in claim 1, wherein a nut is fastened to an upstream end of the hollow rotary shaft in the assembled state.

4. The pipe as claimed in claim 1, wherein splines are provided on the downstream end portion of the first pipe segment and the upstream end portion of the second pipe segment, the splines being enmeshed.

5. The pipe as claimed in claim 1, wherein a rigid intermediate ring is mounted between the deformable ring and the downstream free end of the downstream end portion of the first pipe segment.

6. The pipe as claimed in claim 1, wherein the downstream end portion of the first pipe segment includes a pin which is accommodated in a notch provided in the upstream end portion of the second pipe segment.

7. The pipe as claimed in claim 1, wherein the upstream end portion of the second pipe segment includes a sealing joint housed in a groove and compressed radially between the first pipe segment and the second pipe segment.

8. A pipe for guiding a gas flow in a turbojet including a hollow rotary shaft inside which the pipe is configured to be mounted, the pipe extending overall along an axis, the pipe comprising:
at least first and second pipe segments configured to be assembled with one another in longitudinal alignment while retaining a degree of freedom in relative translation, the first and second pipe segments each including an upstream end portion, a central portion, and a downstream end portion, and the first pipe segment being disposed upstream of the second pipe segment; and
a deformable ring configured to deform radially when the pipe segments are tightened against one another in the hollow rotary shaft of the turbojet, to bear on the hollow rotary shaft,
wherein a diameter of the upstream end portion of the second pipe segment is greater than a diameter of a diameter of the central portion of the second pipe segment,
wherein an upstream end of the downstream end portion of the first pipe segment includes a radial edge, an upstream surface of the deformable ring abutting the radial edge,
wherein, in an unassembled state, an external surface of the deformable ring presents a radius that is less than a radius of an internal surface of the hollow rotary shaft,
wherein, in an assembled state, the downstream end portion of the first pipe segment is sleeved into the upstream end portion of the second pipe segment and the deformable ring is compressed between the radial edge and a upstream free end of the upstream end portion of the second pipe segment such that the deformable ring deforms and the external surface of the deformable ring abuts the internal surface of the hollow rotary shaft.

9. The pipe as claimed in claim 8, wherein the upstream end portion of the first pipe segment includes a seal member.

10. The pipe as claimed in claim 1, wherein a nut is fastened to an upstream end of the hollow rotary shaft in the assembled state.

11. The pipe as claimed in claim 1, wherein splines are provided on the downstream end portion of the first pipe segment and the upstream end portion of the second pipe segment, the splines being enmeshed.

12. The pipe as claimed in claim 8, wherein a rigid intermediate ring is mounted between the deformable ring and the upstream free end of the upstream end portion of the second pipe segment.

13. The pipe as claimed in claim 8, wherein the upstream end portion of the second pipe segment includes a pin which is accommodated in a notch provided in the downstream end portion of the first pipe segment.

14. The pipe as claimed in claim 8, wherein the downstream end portion of the first pipe segment includes a sealing joint housed in a groove and compressed radially between the second pipe segment and the first pipe segment.

15. A pipe for guiding a gas flow in a turbojet including a hollow rotary shaft inside which the pipe is configured to be mounted, the pipe extending overall along an axis, the pipe comprising:
at least first and second pipe segments configured to be assembled with one another in longitudinal alignment while retaining a degree of freedom in relative translation, the first and second pipe segments each including central portions, and the first and second pipe segments including end portions directed towards one another,
a deformable ring having, in an unassembled state, an external surface which presents a radius that is less than a radius of an internal surface of the hollow rotary shaft, and which is configured to deform radially when compressed;
wherein one end portion of one of the first or second pipe segment has a diameter which is greater than a diameter of a diameter of the central portion of said one of the first or second pipe segment, and has a free end;
wherein the end portion of the other of the second or first pipe segment has a free end which is capable of receiving the deformable ring and includes a radial edge offset from said free end of the other of the second or first pipe segment;
wherein a surface of the deformable ring abuts said radial edge,
wherein, in an assembled state, the first and second pipe segments are sleeved at their end portions and tightened against one another in the hollow rotary shaft of the turbojet, to bear on the hollow rotary shaft, so that the deformable ring is compressed between the free end of the end portion of the one of the first or second pipe segment and the radial edge of the end portion of the other of the second or first pipe segment, such that the deformable ring deforms and the external surface of the deformable ring abuts the internal surface of the hollow rotary shaft.

16. The pipe as claimed in claim 15, wherein an upstream end portion of the first pipe segment includes a seal member.

17. The pipe as claimed in claim 15, wherein a nut is fastened to an upstream end of the hollow rotary shaft in the assembled state.

18. The pipe as claimed in claim 15, wherein splines are provided on the end portion of the first pipe segment and the end portion of the second pipe segment, the splines being enmeshed.

19. The pipe as claimed in claim 15, wherein a rigid intermediate ring is mounted between the deformable ring which is mounted on the end portion of the other of the second or first pipe segment, and the free end of the end portion of the one of the first or second pipe segment.

20. The pipe as claimed in claim 15, wherein one of the end portion of the first pipe segment or of the second pipe segment includes a pin extending inwardly which is accommodated in a notch provided in the other of the end portion of the second pipe segment or first pipe segment.

21. The pipe as claimed in claim 15, wherein one of the end portion of the second pipe segment or the end portion of the first pipe segment includes a sealing joint housed in an outwardly turned groove, said sealing joint being compressed radially between the first pipe segment and the second pipe segment.

* * * * *